United States Patent
Tanaka

(10) Patent No.: US 8,914,660 B2
(45) Date of Patent: Dec. 16, 2014

(54) IMAGE PROCESSING APPARATUS AND CONTROL METHOD FOR IMAGE PROCESSING APPARATUS

(75) Inventor: Satoshi Tanaka, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 253 days.

(21) Appl. No.: 13/556,503

(22) Filed: Jul. 24, 2012

(65) Prior Publication Data

US 2013/0036319 A1 Feb. 7, 2013

(30) Foreign Application Priority Data

Aug. 1, 2011 (JP) .................................. 2011-168566

(51) Int. Cl.
*G06F 1/00* (2006.01)
*G06K 15/00* (2006.01)
*G03G 15/00* (2006.01)
*G06F 1/32* (2006.01)

(52) U.S. Cl.
CPC .......... *G03G 15/5004* (2013.01); *G06F 1/3293* (2013.01); *Y02B 60/32* (2013.01)
USPC ............................ 713/323; 713/300; 358/1.14

(58) Field of Classification Search
USPC .................. 713/320, 323; 358/1.14
See application file for complete search history.

(56) References Cited

U.S. PATENT DOCUMENTS

| 8,112,123 | B2* | 2/2012 | Fujimoto | 455/566 |
| 8,694,815 | B2* | 4/2014 | Itoh et al. | 713/330 |
| 2006/0075150 | A1* | 4/2006 | Hwang et al. | 710/14 |
| 2007/0206211 | A1 | 9/2007 | Okutsu et al. | |

FOREIGN PATENT DOCUMENTS

| JP | 2007-194876 | 8/2007 |
| JP | 2010-098653 | 4/2010 |

* cited by examiner

*Primary Examiner* — Stefan Stoynov
(74) *Attorney, Agent, or Firm* — Oblon, Spivak, McClelland, Maier & Neustadt, L.L.P.

(57) ABSTRACT

An image processing apparatus includes a first control unit configured to control the whole apparatus and not to be energized in a power saving mode; and a second control unit configured to be energized in the power saving mode. The second control unit includes a detecting unit configured to detect a return trigger for returning from the power saving mode to a normal mode; an identifying unit configured to identify the return trigger; a storage unit configured to store the identified return trigger into a storage medium; and a starting unit configured to start energizing the first control unit in accordance with the detection of the return trigger. The first control unit includes a reading unit configured to read the stored return trigger after the first control unit is energized; and a first-control-unit control unit configured to determine a function to be activated preferentially based on the return trigger.

9 Claims, 7 Drawing Sheets

IMAGE PROCESSING APPARATUS AND CONTROL METHOD FOR IMAGE PROCESSING APPARATUS

CROSS-REFERENCE TO RELATED APPLICATION

The present application claims priority to and incorporates by reference the entire contents of Japanese Patent Application No. 2011-168566 filed in Japan on Aug. 1, 2011.

BACKGROUND OF THE INVENTION

1. Field of the Invention

The present invention relates to an image processing apparatus and a control method for the image processing apparatus.

2. Description of the Related Art

In recent years, information tends to be computerized, and image processing apparatuses such as a printer or a facsimile used to output computerized information and a scanner used to computerize documents have become indispensable devices. Such an image processing apparatus is often constituted as a multifunction peripheral (MFP) which can be utilized as a printer, a facsimile, a scanner, and a copying machine by having an image capturing function, an image forming function, a communication function, and the like.

In the MFP, it is possible in many cases to enter a power saving mode besides the normal running mode. Such an image processing apparatus enters the power saving mode when the MFP is not used, besides the normal running mode, in order to reduce the consumed power. In the power saving mode, a major part of the MFP is brought into an unenergized state when the MFP is not in the normal running mode, in order to reduce power consumed by the MFP. Often, even energization of a random access memory (RAM) and the like which constitute a control unit is cut off. At the time of return from the power saving mode to the normal mode, therefore, it becomes necessary for the MFP to read a program from a hard disk or a nonvolatile memory and develop the program into the RAM again.

On the other hand, the MFP provides users with various functions such as a copying machine, a printer, a scanner, a FAX and the like, and these functions go on increasing. At the time of return from the power saving mode to the normal mode, therefore, it is necessary to read respective application programs for implementing these functions again and consequently the return time from the power saving mode to the normal mode becomes long. Even when, for example, the user wants to use a scanner, therefore, it is necessary for the user to wait until an application program for implementing the scanner function is read, if the MFP is in the power saving mode. As a result, a state in which the function the user wants to utilize cannot be used readily is brought about.

As a technique for shortening a waiting time lasting until it becomes possible for a user to use an MFP, therefore, a technique of causing the user to select a function to be used, loading a program corresponding to the selected function preferentially from a hard disk to a RAM at the time of return from the power saving mode, making the function available, and then activating another program is disclosed (for example, Japanese Patent Application Laid-open No. 2007-194876).

According to the method disclosed in Japanese Patent Application Laid-open No. 2007-194876, the time over which the user is caused to wait can be shortened, as many selection units as functions to be restored preferentially must be prepared, resulting in increased power consumption. Furthermore, there is a problem that user's operations become troublesome as the selection units increase.

In addition, in operations of the MFP, there are operations executed according to a user's operation of an operating unit and operations executed according to a command which is input via a network. In the case of the latter operations, the method disclosed in Japanese Patent Application Laid-open No. 2007-194876 cannot be used.

Therefore, there is a need for an apparatus capable of shortening the return time of the apparatus from the power saving mode according to a user's intention with a simple configuration and without requesting the user to conduct extra manipulations.

SUMMARY OF THE INVENTION

It is an object of the present invention to at least partially solve the problems in the conventional technology.

According to an embodiment, there is provided an image processing apparatus that includes a first control unit configured to control the whole image processing apparatus and not to be energized in a power saving mode of the image processing apparatus; and a second control unit configured to be energized in the power saving mode. The second control unit includes a return trigger detecting unit configured to detect a return trigger for returning from the power saving mode to a normal mode of the image processing apparatus; a return trigger identifying unit configured to identify the detected return trigger; a return trigger storage unit configured to store the identified return trigger into a storage medium; and a first-control-unit starting unit configured to start energizing the first control unit in accordance with the detection of the return trigger. The first control unit includes a return trigger reading unit configured to read the stored return trigger after the first control unit is energized; and a function activating control unit configured to determine a function to be activated preferentially on the basis of the read return trigger and activate the determined function preferentially.

According to another embodiment, there is provided a control method for an image processing apparatus that includes a first control unit configured to control the whole image processing apparatus and not to be energized in a power saving mode of the image processing apparatus, and a second control unit configured to be energized in the power saving mode. The control method includes generating a return trigger for returning from the power saving mode to a normal mode of the image processing apparatus. The control method includes, by the second control unit, detecting the return trigger; identifying the detected return trigger; storing the identified return trigger into a storage medium; starting energizing the first control unit in accordance with the detection of the return trigger. The control method includes, by the first control unit, reading the stored return trigger after the first control unit is energized; determining a function to be activated preferentially on the basis of the read return trigger; and activating the determined function preferentially.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereafter, an embodiment of the present invention will be described in detail. The present embodiment will be described by taking an image processing apparatus which executes image forming and outputting and which returns from a power saving mode to a normal energization mode in response to a command which is input via a network as an example of an image forming apparatus.

Figure 1:
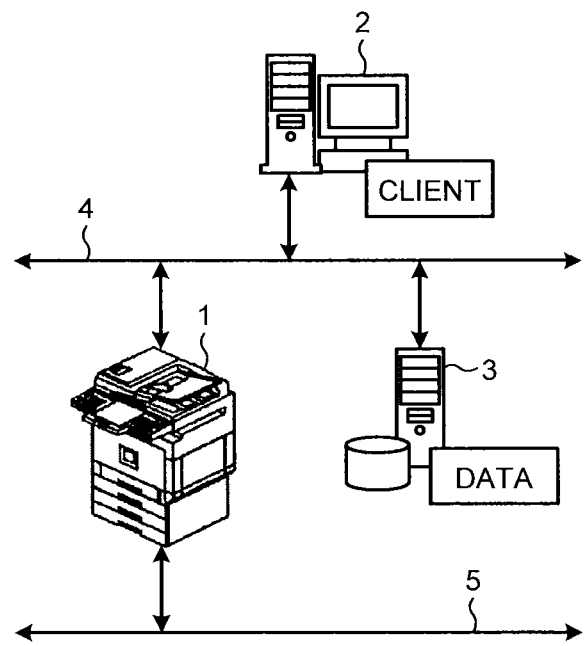
FIG. 1 is a diagram illustrating a running form of a system according to an embodiment of the present invention.

FIG. 1 is a diagram illustrating an example of a running form of a system according to the present embodiment. As illustrated in FIG. 1, the system according to the present embodiment is configured by connecting an image processing apparatus 1, a client terminal 2, and a data management server 3 via a network 4 and connecting the image processing apparatus 1 to a telephone line 5.

The image processing apparatus 1 is an MFP which can be utilized as a printer, a facsimile, a scanner and a copying machine by having an image capturing function, an image forming function, a communication function and the like. In the present embodiment, the image processing apparatus 1 executes image forming and outputting on the basis of a print job received from the client terminal 2 via the network 4.

The client terminal 2 is an information processing terminal operated by the user, and the client terminal 2 is implemented by using an information processing apparatus such as a personal computer (PC). The user can transmit a print job from the client terminal 2 to the image processing apparatus 1 via the network 4 by operating the client terminal 2.

The data management server 3 is a file sharing server which exists on the network, and data which becomes a print object is stored in the data management server 3. The user can select and acquire data to be printed, by accessing the data management server 3 from the image processing apparatus 1 or the client terminal 2 via the network 4.

The network 4 in FIG. 1 is a restricted network such as, for example, an office local area network (LAN). However, it is also possible to adopt a form in which connection is conducted via a wide area network such as the Internet or a telephone line.

A hardware configuration of the image processing apparatus 1, the client terminal 2, and the data management server 3 according to the present embodiment will now be described with reference to FIG. 2. The image processing apparatus 1 according to the present embodiment has an engine for implementing a scanner, a printer, a facsimile, a copying machine and the like in addition to the hardware configuration illustrated in FIG. 2. In the ensuing description, a hardware configuration of the image processing apparatus 1 will be taken as an example. However, the same is true of the client terminal 2 as well.

Figure 2:
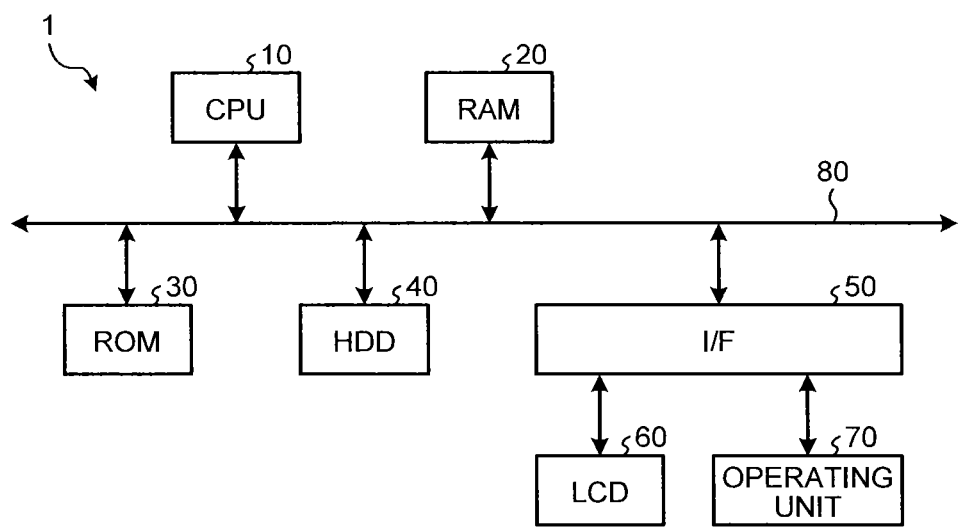
FIG. 2 is a block diagram schematically illustrating a hardware configuration of an image processing apparatus according to the embodiment.

As illustrated in FIG. 2, the image processing apparatus 1 according to the present embodiment includes a configuration similar to that of a general server or PC. In other words, in the image processing apparatus 1 according to the present embodiment, a central processing unit (CPU) 10, a random access memory (RAM) 20, a read only memory (ROM) 30, a hard disk drive (HDD) 40 and an I/F 50 are connected via a bus 80. Furthermore, a liquid crystal display (LCD) 60 and an operating unit 70 are connected to the I/F 50.

The CPU 10 is an operation unit, and the CPU 10 controls operations of the whole image processing apparatus 1. The RAM 20 is a volatile storage medium from/into which information can be read/written fast, and the RAM 20 is used as a working area when the CPU 10 conducts processing on information. The ROM 30 is a non-volatile storage medium which is used exclusively for reading, and a program such as firmware is stored therein. The HDD 40 is a non-volatile storage medium from/into which information can be read/written, and an operating system (OS) and various control programs and application programs, and the like are stored therein.

The I/F 50 connects the bus 80 to various kinds of hardware and networks and the like, and controls them. The LCD 60 is a visual user interface used by the user to ascertain the state of the image processing apparatus 1. The operating unit 70 is a user interface, such as a keyboard or a mouse, used by the user to input information to the image processing apparatus 1. As described with reference to FIG. 1, the data management server 3 according to the present embodiment is run as the sharing server. Therefore, the user interfaces such as the LCD 60 and the operating unit 70 can be omitted.

In such a hardware configuration, a program stored in a storage medium such as the ROM 30, the HDD 40, or an optical disk which is not illustrated is read out into the RAM 20, and the CPU 10 performs operations in accordance with the program loaded into the RAM 20, and consequently a software control unit is constituted. By a combination of the software control unit constituted in this way and hardware, a function block which implements functions of the image processing apparatus 1, the client terminal 2, and the data management server 3 is constituted.

Figure 3:
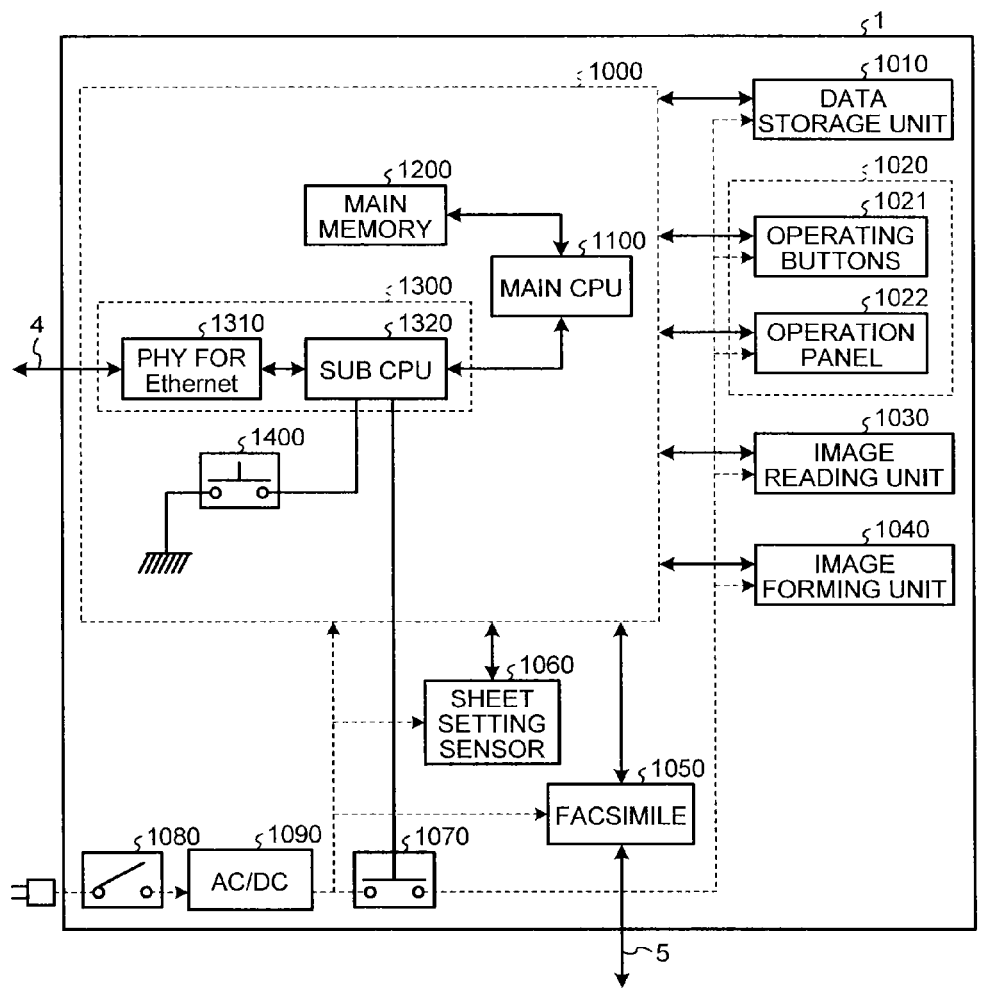
FIG. 3 is a block diagram illustrating a function configuration of an image processing apparatus according to the embodiment.

A hardware configuration of the image processing apparatus 1 according to the present embodiment will now be described with reference to FIG. 3. FIG. 3 is a block diagram illustrating the hardware configuration of the image processing apparatus 1 according to the present embodiment. As illustrated in FIG. 3, the image processing apparatus 1 according to the present embodiment includes a controller 1000, a data storage unit 1010, an operating unit 1020, an image reading unit 1030, an image forming unit 1040, a facsimile 1050, a sheet setting sensor 1060, a main unit power supply switch 1070, a main power supply switch 1080, and an AC/DC power supply generation unit 1090.

Furthermore, the controller 1000 includes a signal receiving unit 1300 and a sub power supply switch 1400 besides a main CPU 1100 which is equivalent to the above-described CPU 10 and a main memory 1200 which is equivalent to the above-described RAM 20. In addition, the signal receiving unit 1300 includes a PHY 1310 for Ethernet (registered trademark) and a sub CPU 1320. In FIG. 3, electrical connections are represented by solid line arrows and power flows are represented by dashed line arrows.

The controller 1000 functions by cooperative operations of software and hardware. Specifically, the controller 1000 functions owing to cooperation between the software control unit constituted by that a program stored in the data storage unit 1010 which is constituted by the ROM 30, or a non-volatile memory, the HDD 40 or an optical disk, and the like is loaded into a volatile memory (hereafter referred to as memory) such as the main memory 1200, and the main CPU 1100 performs operations according to the program, and hardware such as the signal receiving unit 1300 and the sub power supply switch 1400. The controller 1000 functions as a control unit which controls the whole image processing apparatus 1.

The main CPU 1100 plays a role of controlling various units included in the controller 1000, and gives instructions to the various units in the controller 1000. The main memory 1200 is equivalent to the RAM 20 illustrated in FIG. 2, and the main memory 1200 is used as a working area when the main CPU 1100 processes information. The main CPU 1100 is on in power supply when the main unit power supply switch 1070 or the sub power supply switch 1400 is on, whereas the main CPU 1100 is off in power supply when the main unit power supply switch 1070 or the sub power supply switch 1400 is off.

The signal receiving unit 1300 includes the PHY 1310 for Ethernet (registered trademark) and the sub CPU 1320, and the signal receiving unit 1300 plays a role of network connection. The signal receiving unit 1300 sends a network signal which is input to the PHY 1310 for Ethernet (registered trademark) via the network 4, to the main CPU 1100 via the sub CPU 1320. As a result, the image processing apparatus 1 is network-connected via the network 4.

The sub CPU 1320 detects a signal which becomes a return trigger generated by the operating unit 1020, the image reading unit 1030, the facsimile 1050, the sheet setting sensor 1060, or the PHY 1310 for Ethernet (registered trademark), and discriminates where the detected return trigger is generated. Furthermore, upon detecting the return trigger, the sub CPU 1320 plays a role of switching the main CPU 1100 in a power supply off-state in the energy saving mode of the image processing apparatus 1 to a power supply on-state.

Here, the return trigger is a trigger for shifting the mode of the image processing apparatus 1 from an energy saving mode to a standby mode, and upon detecting the return trigger, the sub CPU 1320 executes control to shift the mode from the energy saving mode to the standby mode. As for this, the sub CPU 1320 includes an SRAM serving as a cache memory therein and performs operations in accordance with a return trigger detection program loaded into the SRAM, and thereby executes a return trigger detection operation and a return operation. Mode shift to different modes will be described later.

It is also possible to adopt a configuration in which a return trigger program is read out into a memory, such as the main memory 1200, located outside the sub CPU 1320 instead of the SRAM and the sub CPU 1320 performs operations in accordance with the program and consequently the above-described function is implemented. According to the return trigger detection function constituted by the sub CPU 1320, it is possible to identify the detected return trigger has been generated as described above. Therefore, it is possible to determine a function to be made available preferentially and activate an application corresponding to the function. This is one of spirits according to the present embodiment.

Furthermore, the sub CPU 1320 plays a role of network response of automatically transmitting a network signal which is input to the PHY 1310 for Ethernet (registered trademark), to the main CPU 1100 in the energy saving mode.

In addition, the sub CPU 1320 has a function of controlling devices such as a timer clock. If there is not a user's operation on the image processing apparatus 1 or the apparatus operation for a predetermined time in the standby mode of the image processing apparatus 1, the sub CPU 1320 automatically switches the main unit power supply switch 1070 from on to off. At this time, the image processing apparatus 1 enters the energy saving mode from the standby mode. To the contrary, if the sub CPU 1320 detects a return trigger in the energy saving mode of the image processing apparatus 1, the sub CPU 1320 automatically switches the main unit power supply switch 1070 from off to on. At this time, the image processing apparatus 1 enters the standby mode from the energy saving mode The sub power supply switch 1400 is switched in on/off when the user has directly operated it, and its switching signal is sent to the sub CPU 1320. Upon receiving the switching signal, the sub CPU 1320 automatically conducts switching of the main unit power supply switch 1070.

When the image processing apparatus 1 is in the energy saving mode, the user operates the sub power supply switch 1400. As a result, the sub CPU 1320 shifts the mode of the image processing apparatus 1 from the energy saving mode to the standby mode. At this time, the sub power supply switch 1400 switches from off to on. Upon receiving the switching signal, the sub CPU 1320 switches the main unit power supply switch 1070 from off to on in accordance with the received switching signal. To the contrary, the user operates the sub power supply switch 1400 when the image processing apparatus 1 is in the standby mode. As a result, the sub CPU 1320 shifts the mode of the image processing apparatus 1 from the standby mode to the energy saving mode. At this time, the sub power supply switch 1400 switches from on to off. Upon receiving the switching signal, the sub CPU 1320 switches the main unit power supply switch 1070 from on to off in accordance with the received switching signal.

The data storage unit 1010 is equivalent to the HDD 40 illustrated in FIG. 2. The HDD 40 is a non-volatile storage medium from/into which information can be read/written, and an OS for controlling the image processing apparatus 1 and various control programs and application programs, and the like are stored therein. Furthermore, the data storage unit 1010 includes a non-volatile storage medium used exclusively for reading which is equivalent to the ROM 30 illustrated in FIG. 2. When the image processing apparatus 1 is in the energy saving mode, the data storage unit 1010 is not supplied with power supply, because the main unit power supply switch 1070 is off.

The operating unit 1020 includes operating buttons 1021 and an operation panel 1022. The operating buttons 1021 are an input interface used when the user directly operates the image processing apparatus 1 or the user inputs information to the image processing apparatus 1. The operating buttons 1021 include a plurality of buttons which are not illustrated. When the image processing apparatus 1 is in the standby mode, the operating buttons 1021 generate a signal corresponding to a user's key operation and send the signal to the main CPU 1100.

When the image processing apparatus 1 is in the energy saving mode, the operating buttons 1021 have a function of serving as a sensor for detecting that the user has touched some of the operating buttons, generating a detection signal, and sending the detection signal to the sub CPU 1320. In other words, even if the user operates any button among the operating buttons 1021 when the image processing apparatus 1 is in the energy saving mode, the operating buttons 1021 do not generate a signal associated with the key operation but generate only a signal obtained by detecting that the user has touched the operating buttons 1021. Even when the image processing apparatus 1 is in the energy saving mode, a power supply required for the operating buttons 1021 to function as the sensor is ensured separately. The operating buttons 1021 are implemented by the operating unit 70 illustrated in FIG. 2.

The operation panel 1022 is not only an output interface which visually displays the state of the image processing apparatus 1, but also an input interface used as a touch panel when the user directly operates the image processing apparatus 1 or inputs information to the image processing apparatus 1. In other words, the operation panel 1022 includes a function of displaying an image for receiving a user's operation. When the image processing apparatus 1 is in the standby mode, the operation panel 1022 generates a signal associated with the user's panel operation and sends the signal to the main CPU 1100.

Furthermore, when the image processing apparatus 1 is in the energy saving mode, the operation panel 1022 has a function of serving as a sensor for detecting that the user has touched the operation panel 1022, generating a detection signal, and sending the detection signal to the sub CPU 1320. In other words, even if the user operates any part of the operation panel 1022 when the image processing apparatus 1 is in the energy saving mode, the operation panel does not generate a signal associated with the panel operation, but generate only a signal obtained by detecting that the user has touched the operation panel 1022. Even when the image processing apparatus 1 is in the energy saving mode, a power supply required for the operation panel 1022 to function as the sensor is ensured separately. The operation panel 1022 is implemented by the LCD 60 and the operating unit 70 illustrated in FIG. 2.

The image reading unit 1030 captures an image of a document and sends acquired image capturing information to the main CPU 1100, under control of the main CPU 1100. The image forming unit 1040 forms drawing information generated on the basis of image information to be printed and output, as an image under control of the main CPU 1100. The image reading unit 1030 and the image forming unit 1040 are not supplied with power supply when the image processing apparatus 1 is in the energy saving mode, because the main unit power supply switch 1070 is off.

The facsimile 1050 receives image information via the telephone line 5, and sends the image information to the main CPU 1100. Furthermore, the facsimile 1050 transmits the image information to an image processing apparatus located in another place via the telephone line 5 in response to user's operation. Since the facsimile 1050 must always monitor reception from the telephone line 5, the facsimile 1050 is supplied with power supply even in the energy saving mode.

When the image processing apparatus 1 is in the energy saving mode, the sheet setting sensor 1060 functions as a sensor for detecting that a sheet is set in the image reading unit 1030, generating a detection signal, and sending the detection signal to the sub CPU 1320. Since the sheet setting sensor 1060 must always monitor setting of a sheet, the sheet setting sensor 1060 is supplied with power supply even if the image processing apparatus 1 is in the energy saving mode.

If there is not a user's operation on the image processing apparatus 1 or the apparatus operation for a predetermined time when the image processing apparatus 1 is in the standby mode, the main unit power supply switch 1070 is automatically switched from on to off under the control of the sub CPU 1320. At this time, the image processing apparatus 1 enters the energy saving mode from the standby mode. Furthermore, if the sub CPU 1320 detects a return trigger when the image processing apparatus 1 is in the energy saving mode, the main unit power supply switch 1070 is automatically switched from off to on under the control of the sub CPU 1320. At this time, the image processing apparatus 1 enters the standby mode from the energy saving mode.

When the main unit power supply switch 1070 is off, the data storage unit 1010, the operating buttons 1021, the operation panel 1022, the image reading unit 1030, and the image forming unit 1040 are not supplied with power supply. Even when the main unit power supply switch 1070 is off, power supply required when the operating buttons 1021 and the operation panel 1022 function as the sensors is supplied separately as described above.

Furthermore, switching of the main unit power supply switch 1070 between on/off is executed by operating the sub power supply switch 1400 via the control of the sub CPU 1320. In other words, when the sub power supply switch 1400 has switched from off to on, the main unit power supply switch 1070 also switches from off to on under the control of the sub CPU 1320. Furthermore, when the sub power supply switch 1400 has switched from on to off, the main unit power supply switch 1070 also switches from on to off under the control of the sub CPU 1320.

The main power supply switch 1080 is switched in on/off by a user's operation only when the sub power supply switch 1400 is off or the main unit power supply switch 1070 is off, i.e., only when the mode is the energy saving mode. When the main power supply switch 1080 is off, there is no power supply to all devices included in the image processing apparatus 1. When the main power supply switch 1080 is off, the image processing apparatus 1 can assume a plurality of modes. This will now be described later.

The AC/DC power supply generation unit 1090 converts an AC power supply which is input from a plug receptacle to a DC power supply suitable for the image processing apparatus 1, and supplies the image processing apparatus 1 with the DC power supply.

Figure 4:
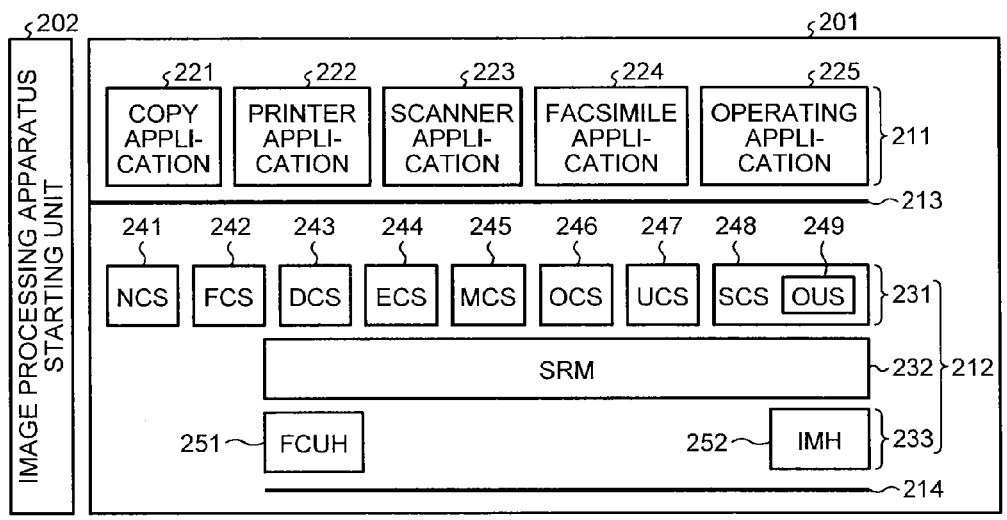
FIG. 4 is a diagram illustrating a software configuration of an image processing apparatus according to the embodiment.

A software configuration of the image processing apparatus 1 according to the present embodiment will now be described with reference to FIG. 4. FIG. 4 is a block diagram illustrating a software configuration of the image processing apparatus 1 according to the present embodiment. As software 201, there are various applications 211 and a platform 212. They are executed in parallel with a process taken as the unit by an OS such as UNIX (registered trademark).

The applications 211 are software for executing information processing peculiar to respective functions of the image processing apparatus 1. As the applications 211, there are a copy application 221 which is an application for copying machine, a printer application 222 which is an application for printer, a scanner application 223 which is an application for scanner, a facsimile application 224 which is an application for facsimile, and an operating application 225 which is an application for controlling the operating unit 1020. Besides them, the applications 211 may include Web server software for delivering HTML documents and the like, a network file application including a Web browser for perusing HTML documents and the like.

The platform 212 is software for executing information processing concerning processing requests issued to respective kinds of hardware in the image processing apparatus 1 by the applications 211. For reception of a processing request from the applications 211, an application programming interface (API) 213 which receives a processing request by using a predefined function is utilized. For transmission of a processing request to each hardware in the image processing apparatus 1, an engine interface (ENI) 214 which transmits a processing request by using a predefined function is utilized. The platform 212 includes various control services 231, a system resource manager (SRM) 232, and various handlers 233.

The control services 231 interpret processing requests sent from the applications 211 to respective kinds of hardware in the image processing apparatus 1, and generate acquisition requests of respective kinds of hardware in the image processing apparatus 1 in accordance with a result of the interpretation. As the control services 231, there are a network control service (NCS) 241, a facsimile control service (FCS) 242, a delivery control service (DCS) 243, an engine control service (ECS) 244, a memory control service (MCS) 245, an operation control service (OCS) 246, a user directory control service (UCS) 247, a system control service (SCS) 248, and an on-demand update service (OUS) 249.

A process of the NCS 241 provides an API for conducting data communication via a network or the like. A process of the FCS 242 provides an API for conducting image data communication, image data acquisition, image data printing and the like as the facsimile. A process of the DCS 243 exercises control concerning delivery of document data stored in the image processing apparatus 1. A process of the ECS 244 exercises control concerning the image reading unit 1030 and the image forming unit 1040 included in the image processing apparatus 1. A process of the MCS 245 exercises control concerning memories and hard disk drives for image data storage, image data processing and the like. A process of the OCS 246 exercises control concerning the operation panel. A process of the UCS 247 exercises control concerning management of user information. A process of the SCS 248 exercises control concerning management of the system. A process of the OUS 249 exercises control concerning program update.

The control service 231 includes a return control module which controls the return operation at the time when the image processing apparatus 1 returns from the energy saving mode. The return control module will be described in detail later. A configuration in which the return control module is included in the applications 211 may be adopted.

The SRM 232 exercises control for arbitrating acquisition requests for the respective kinds of hardware in the image processing apparatus 1 and implementing processing requests for the respective kinds of hardware in the image processing apparatus 1 in accordance with a result of the arbitration. A process of the SRM 232 makes a decision whether each kind of hardware in the image processing apparatus 1 concerning an acquisition request can be utilized (whether an acquisition request does not compete with another acquisition request). If it can be utilized, the process of the SRM 232 gives a notice to that effect to the control service 231. In addition, the process of the SRM 232 creates a utilization schedule of respective kinds of the hardware in the image processing apparatus 1 concerning the acquisition requests, and exercises control for implementing the processing requests to respective kinds of hardware in the image processing apparatus 1 in accordance with a result of the creation.

The handlers 233 manage the respective kinds of the hardware in the image processing apparatus 1 in accordance with the result of the arbitration. As the handlers 233, there are a facsimile control unit handler (FCUH) 251 and an image memory handler (IMH) 252. The FCUH 251 manages a facsimile control unit. The IMH 252 assigns memories to respective processes, and the respective processes manage memories assigned to them.

An image processing apparatus activating unit 202 is executed first when the power supply of the image processing apparatus 1 is turned on, i.e., a main power supply 1080 is switched from off to on. As a result, the OS such as UNIX (registered trademark) is activated, and the platform 212 is activated, and in addition the applications 211 are activated. These programs are stored in the data storage unit 1010, and activated by being read out into the main memory 1200.

Figure 5:
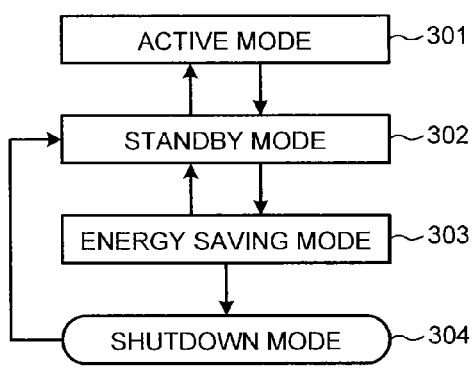
FIG. 5 is a diagram illustrating mode shift of the image processing apparatus according to the embodiment.

Modes which can be assumed by the image processing apparatus 1 will now be described with reference to FIG. 5. FIG. 5 is a diagram illustrating mode shift of the image processing apparatus 1 according to the present embodiment. As illustrated in FIG. 5, in modes of the image processing apparatus 1, there are an active mode 301, a standby mode 302, an energy saving mode 303, and a shutdown mode 304.

The active mode 301 is a state in which the image processing apparatus 1 keeps at least one function among functions the image processing apparatus 1 has, such as the copy, printer, scanner and facsimile, in the operation state, and consumed power is maximized. When an instruction of apparatus operation is executed, a shift from the standby mode to the active mode 301 is made.

The standby mode 302 is a mode in which the image processing apparatus 1 is waiting and the image processing apparatus 1 can execute an instruction of an apparatus operation readily. In other words, the image processing apparatus 1 in the standby mode is in a state in which the user can use at least one of the functions the image processing apparatus 1 has. When the apparatus operation is finished, a transition from the active mode 301 to the standby mode 302 is made. Furthermore, when the main power supply switch 1080 is switched from off to on in the shutdown mode, a transition to the standby mode 302 is also made. In the standby mode 302, all of the main unit power supply switch 1070, the main power supply switch 1080, and the sub power supply switch 1400 illustrated in FIG. 3 are on.

The energy saving mode 303 is a mode in which the consumed power is the lowest and the main unit power supply switch 1070 or the sub power supply switch 1400 is off. In this mode, power supply is not supplied to the data storage unit 1010, the operating buttons 1021, the operation panel 1022, the image reading unit 1030, the image forming unit 1040, the main CPU 1100, and the main memory 1200. Even in the state of the energy saving mode 303, however, power supply required when the operating buttons 1021 and the operation panel 1022 function as sensors is supplied separately as described above. In the energy saving mode 303, the detection of a return trigger and the network response are conducted in the sub CPU 1320.

If there is not a user's operation on the image processing apparatus 1 or the apparatus operation for a predetermined time when the image processing apparatus 1 is in the standby mode 302, then the image processing apparatus 1 enters the energy saving mode 303. At this time, the main unit power supply switch 1070 and the sub power supply switch 1400 are switched from on to off. To the contrary, if the sub CPU 1320 has detected a return trigger when the image processing apparatus 1 is in the energy saving mode 303, then the image processing apparatus 1 enters the standby mode 302.

Since the main memory 1200 is a volatile storage medium, information is lost if there is not power supply. When the shift to the energy saving mode 303 is made, therefore, an image of a storage area in the main memory 1200 is copied to the data storage unit 1010 which is a non-volatile storage medium. At the time of return from the energy saving mode 303, therefore, return to the mode before the shift to the energy saving mode 303 can be conducted by reading the image of the main memory 1200 copied into the data storage unit 1010, again.

The shutdown mode 304 is a mode in which the main power supply switch 1080 is off and there is no power supply to all devices included in the image processing apparatus 1. The main power supply switch 1080 is switched from on to off and the image processing apparatus 1 enters the shutdown mode 304 by a user's operation only when the sub power supply switch 1400 is off or the main unit power supply switch 1070 is off, i.e., only in the energy saving mode 303.

Figure 6:
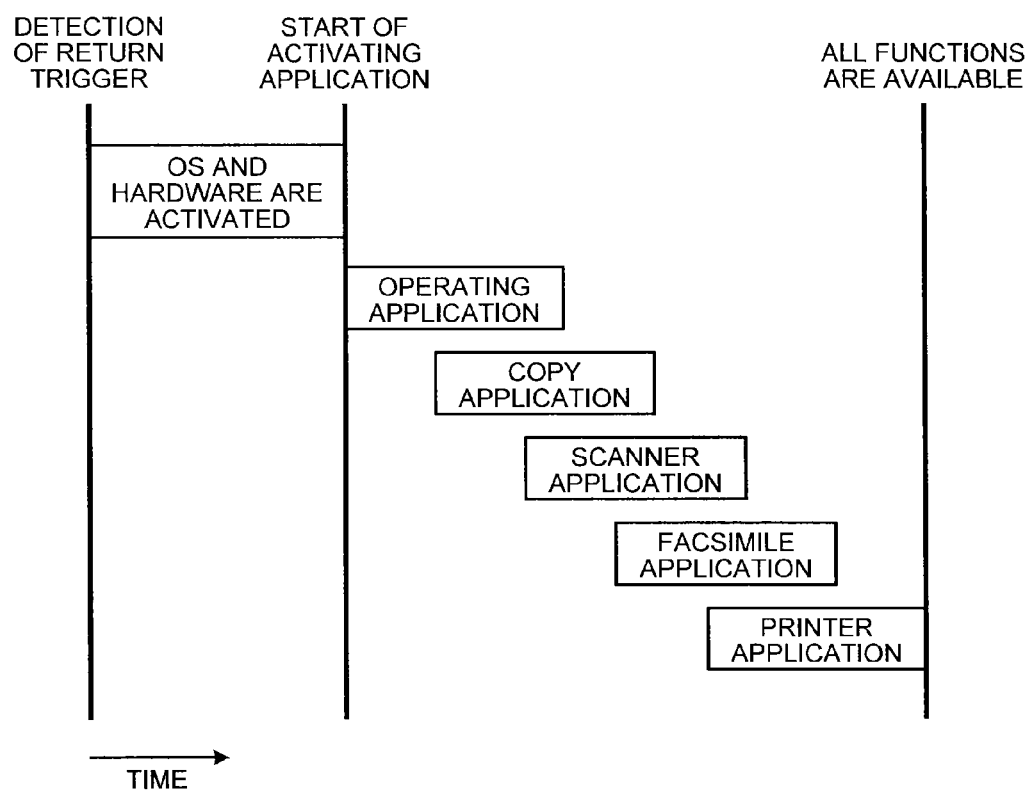
FIG. 6 is a diagram illustrating progress with time of a return operation from an energy saving mode to a standby mode in a conventional image processing apparatus.

Prior to description of a return operation from the energy saving mode to the standby mode in the image processing apparatus 1 according to the present embodiment, a return operation from the energy saving mode to the standby mode in the conventional image processing apparatus will be described briefly with reference to FIG. 6. FIG. 6 is a diagram illustrating progress with time of the return operation from the energy saving mode to the standby mode in the conventional image processing apparatus. In the conventional image processing apparatus, any function cannot be used since activating of an application is started until all applications have activated, as illustrated in FIG. 6.

As a matter of fact, a predetermined activating sequence of applications is not restricted to that illustrated in FIG. 6. However, it is common to conventional image processing apparatuses that the activating sequence cannot be changed and any function cannot be used until all applications are finished in activating.

Figure 7:
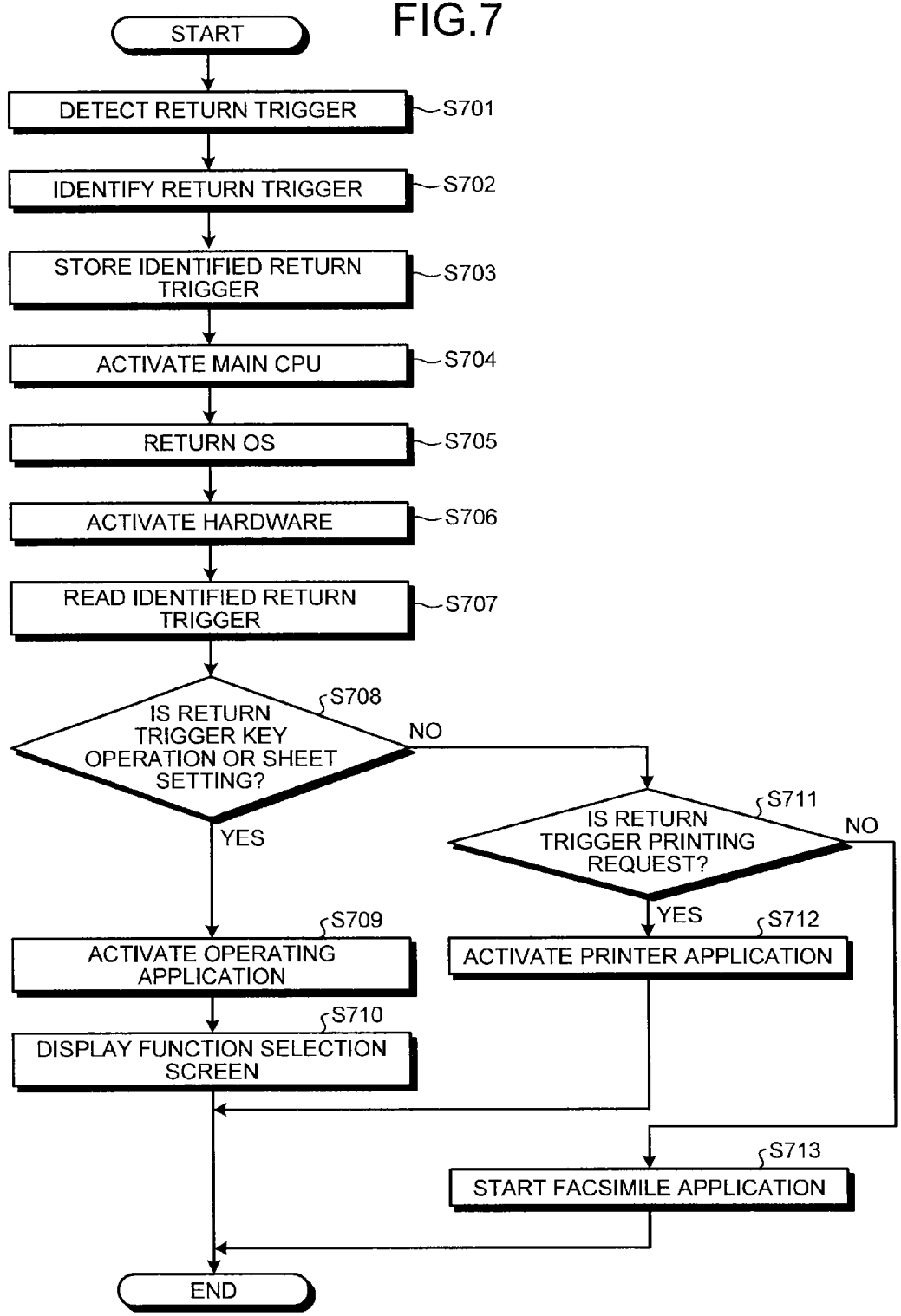
FIG. 7 is a flow chart illustrating a return operation procedure from an energy saving mode to a standby mode in the image processing apparatus.

A return operation procedure from the energy saving mode to the standby mode in the image processing apparatus 1 according to the present embodiment will now be described with reference to FIG. 7. FIG. 7 is a flow chart illustrating a return operation procedure from the energy saving mode to the standby mode in the image processing apparatus 1 according to the present embodiment. When the image processing apparatus 1 returns from the energy saving mode to the standby mode, a return trigger is first generated. As the return trigger, there are a user's operation on the operating unit 1020, reception of image information of the facsimile 1050, detection of sheet setting by the sheet setting sensor 1060, and reception of a printing request in the PHY 1310 for Ethernet (registered trademark). In other words, the operating unit 1020, the facsimile 1050, the sheet setting sensor 1060, and the PHY 1310 for Ethernet (registered trademark) function as return trigger generation units.

If a return trigger is generated, then, first, the sub CPU 1320 detects the return trigger (step S701). At this time, the sub CPU 1320 functions as a return trigger detection unit. Then, the sub CPU 1320 identifies the detected return trigger (step S702). At this time, the sub CPU 1320 functions as a return trigger identifying unit. The sub CPU 1320 stores the identified return trigger into a memory included in itself (step S703). At this time, the sub CPU 1320 functions as a return trigger storage unit. And the sub CPU 1320 switches the main CPU 1100 serving as the main control unit from a power supply off-state to a power supply on-state and activates the main CPU 1100 (step S704). At this time, the sub CPU 1320 functions as a first-control-unit starting unit.

If the main CPU 1100 is activated, then the main CPU 1100 reads out the image of the main memory 1200 stored in the data storage unit 1010 into the main memory 1200, and thereby causes the operating system to return (step S705) and activates hardware (S706). As a result, the software configuration of the platform 212 described with reference to FIG. 4 is reconstructed on the recording area of the main memory 1200, and the above-described return control module is also activated. Thereafter, the return control module reads the return trigger stored at step S703 (step S707). At this time, the return control module functions as a return trigger reading unit. The return control module makes a decision whether the return trigger which is read is a user's key operation or sheet setting or not (step S708). Here, the key operation refers to that the user touches the operating buttons 1021 or the operation panel 1022 or the user operates the sub power supply switch 1400.

If the return trigger read at step S707 is determined to be a user's key operation or sheet setting (step S708, YES), this return trigger is generated as a result of user's direct operation on the image processing apparatus 1. In that case, it is considered that the user is within a short distance from the image processing apparatus 1 and consequently it is necessary to preferentially activate an application for making the operating unit 1020 available and make the shift to a state in which the next operation of the user is possible, as soon as possible.

If the return control module determines the return trigger read at step S707 to be a user's key operation or sheet setting (step S708, YES), therefore, the return control module preferentially activates the operating application 225 (step S709). Here, the return control module functions as a function activating control unit. And a function selection screen is displayed (step S710), and it becomes possible to use the operating unit 1020. And the image processing apparatus 1 completes the shift from the energy saving mode to the standby mode.

If the return trigger read at the S707 is determined to be neither a user's key operation nor sheet setting (step S708, NO), the return trigger has been generated without the user's direct operation on the image processing apparatus 1. Here, the return trigger generated without the user's direct operation on the image processing apparatus 1 is a return trigger generated by reception of a printing request via the network 4 or reception of image information via the telephone line 5. In this case, therefore, it is necessary to preferentially activate an application for making the image forming unit 1040 or the facsimile 1050 available and change the image processing apparatus 1 to a state in which the printer function or the facsimile function can be used, as soon as possible.

If the return trigger read at step S707 is determined not to be a user's key operation or sheet setting (step S708, NO), the return control module makes a decision whether the return trigger which is read is a printing request (step S711). If the return trigger is a printing request (step S711, YES), it is necessary to preferentially activate an application for making the printer function available and change to a state in which printing is possible, as soon as possible. Therefore, the return control module preferentially activates the printer application 222 (step S712), and the image processing apparatus 1 completes the shift from the energy saving mode to the standby mode. At this time, the image processing apparatus 1 functions as the function activating control unit.

On the other hand, if the return trigger is not a printing request (step S711, NO), it is necessary to preferentially activate an application for making the facsimile function available and change to a state in which reception of image information by the facsimile 1050 is possible, as soon as possible. Therefore, the return control module preferentially activates the facsimile application 224 (step S713), and the image processing apparatus 1 completes the shift from the energy saving mode to the standby mode.

As for applications other than the preferentially activated application, they may be activated in a predetermined order and returned to an available state, or they may be kept in the unavailable state, i.e., in the energy saving mode. Or a configuration in which the user suitably switches to one of the two alternatives may be adopted. Furthermore, the predetermined order may be adapted to be set freely by the user. They will be described with reference to FIG. 8 and FIG. 9.

Figure 8:
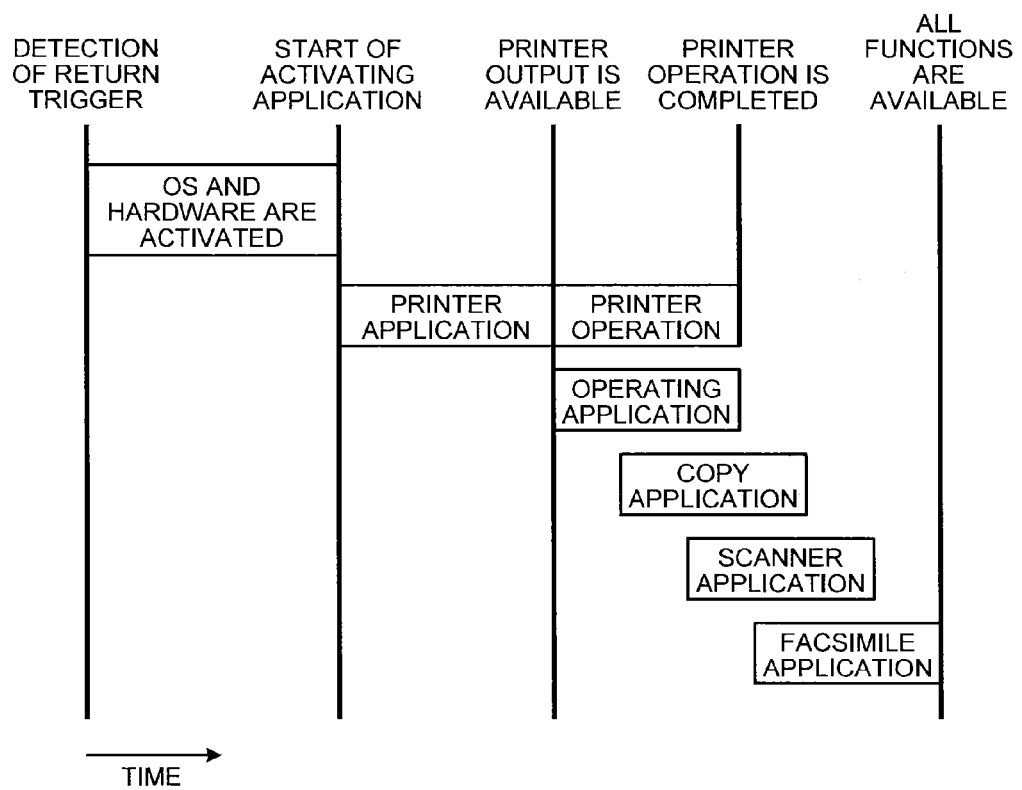
FIG. 8 is a diagram illustrating progress with time of a return operation from the energy saving mode to the standby mode in the image processing apparatus according to the embodiment.

FIG. 8 is a diagram illustrating progress with time of a return operation from the energy saving mode to the standby mode in the image processing apparatus 1 according to the present embodiment. In FIG. 8, a case where the return trigger is the printing request is taken as an example. If activating of an application having a certain specific function is completed, it is possible in the image processing apparatus 1 according to the present invention to use the function of the application finished in activating without waiting for completion of activating of applications for other functions as illustrated in FIG. 8.

As for applications for other functions, they are activated successively in the background during operation of the function which has become usable, and eventually all functions become available. By adopting such a configuration, the time required until all functions become available can be shortened and consumed power can be reduced as compared with conventional image processing apparatuses.

Figure 9:
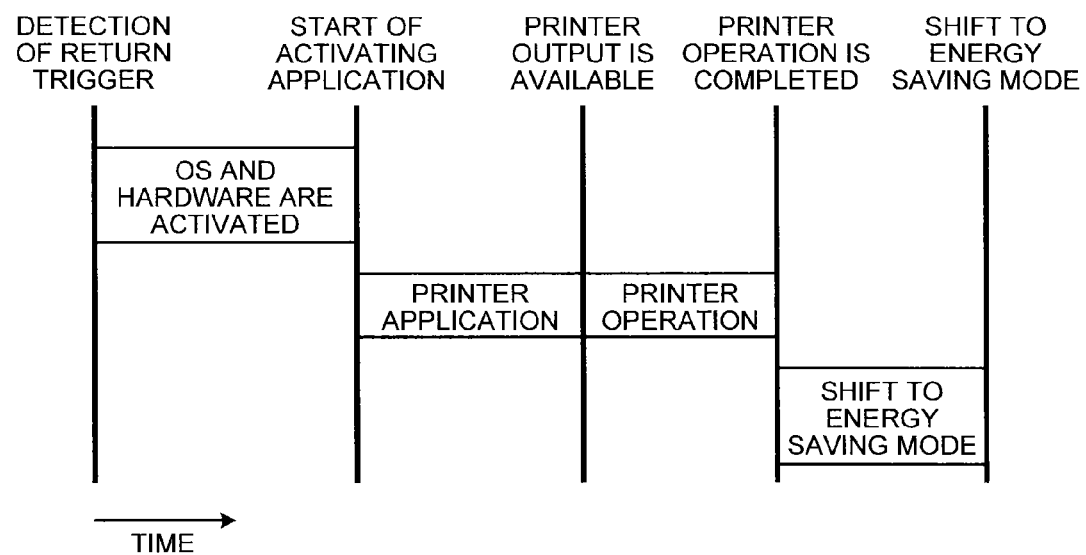
FIG. 9 is a diagram illustrating progress with time of a return operation from the energy saving mode to the standby mode in the image processing apparatus according to the embodiment.

Furthermore, if activating of an application for a certain specific function is completed, applications for other functions may be kept in the unusable state as they are, as illustrated in FIG. 9. FIG. 9 is a diagram illustrating progress with time of a return operation from the energy saving mode to the standby mode in the image processing apparatus 1 according to the present embodiment. Incidentally, in FIG. 9, a case where the return trigger is the printing request is taken as an example. If activating of an application having a certain specific function is completed, it is possible in the image processing apparatus 1 according to the present invention to use the function of the application finished in activating without waiting for completion of activating of applications for other functions as illustrated in FIG. 9.

As for applications for other functions, they remain in the unavailable state, and a transition to the energy saving mode is made immediately, after operation of the function which has become usable is completed. By adopting such a configuration, the start time is shortened because only the function to be used is activated. Since a transition to the energy saving mode is made quickly if use of the function is finished, consumed power can be further reduced.

According to the embodiment, it is possible to shorten the return time of an apparatus from the power saving mode according to a user's intention to use the apparatus with a simple configuration and without requesting the user to conduct extra manipulations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
   a first controller configured to control the whole image processing apparatus and not to be energized in a power saving mode of the image processing apparatus; and
   a second controller configured to be energized in the power saving mode, wherein
   the second controller includes
      a return trigger detecting unit configured to detect a return trigger for returning from the power saving mode to a normal mode of the image processing apparatus,
      a return trigger identifying unit configured to identify the detected return trigger,
      a return trigger memory to store the identified return trigger into a storage medium, and
      a first controller starting unit configured to start energizing the first control unit in accordance with the detection of the return trigger, and
   the first controller includes
      a return trigger reading unit configured to read the stored return trigger after the first control unit is energized, and
      a function activating controller configured to determine a function to be activated preferentially on the basis of the read return trigger and activate the determined function preferentially,
   wherein the function activating controller determines a function to be preferentially activated on the basis of the read return trigger and activates only the determined function.

2. The image processing apparatus according to claim 1, wherein the function to be activated preferentially is available even when there is another function before having been activated.

3. The image processing apparatus according to claim 1, wherein if the read return trigger is a user's direct operation on the image processing apparatus, the function activating controller preferentially activates a function of processing the user's direct operation on the image processing apparatus.

4. The image processing apparatus according to claim 1, wherein the second controller causes the image processing apparatus to be in the power saving mode after the function which was activated preferentially is finished.

5. A control method for an image processing apparatus that includes a first controller configured to control the whole image processing apparatus and not to be energized in a power saving mode of the image processing apparatus, and a second controller configured to be energized in the power saving mode, the control method comprising:
   generating a return trigger for returning from the power saving mode to a normal mode of the image processing apparatus;
   by the second controller,
      detecting the return trigger;
      identifying the detected return trigger;
      storing the identified return trigger into a storage medium;
      starting energizing the first controller in accordance with the detection of the return trigger;
   by the first controller,
      reading the stored return trigger after the first controller is energized;
      determining a function to be activated preferentially on the basis of the read return trigger; and
      activating the determined function preferentially,
   wherein the determining of a function to be activated preferentially includes determining of the function to be preferentially activated on the basis of the read return trigger and activates only the determined function.

6. An image processing apparatus, comprising:
   first processing circuitry to control the whole image processing apparatus and not to be energized in a power saving mode of the image processing apparatus; and second processing circuitry to be energized in the power saving mode, wherein
the second processing circuitry is configured to:
  detect a return trigger for returning from the power saving mode to a normal mode of the image processing apparatus,
  identify the detected return trigger,
  store the identified return trigger into a storage medium, and
  start energizing the first processing circuitry in accordance with the detection of the return trigger, and
the first processing circuitry is configured to
  read the stored return trigger after the first control unit is energized, and
  determine a function to be activated preferentially on the basis of the read return trigger and activate the determined function preferentially,
wherein the determining of the function to be activated preferentially includes determining a function to be preferentially activated on the basis of the read return trigger and activates only the determined function.

7. The image processing apparatus according to claim 6, wherein the function to be activated preferentially is available even when there is another function before having activated.

8. The image processing apparatus according to claim 6, wherein if the read return trigger is a user's direct operation on the image processing apparatus, the first processing circuitry preferentially activates a function of processing the user's direct operation on the image processing apparatus.

9. The image processing apparatus according to claim 6, wherein the second processing circuitry causes the image processing apparatus to be in the power saving mode after the function which was activated preferentially is finished.

* * * * *